4 Sheets--Sheet 1.

D. W. G. & E. HUMPHREY.
Sewing-Machines.

No.152,231. Patented June 23, 1874.

Witnesses,
Herbert T. Whitman
Eben Hutchinson

Inventors,
Daniel W. G. Humphrey
Eugene Humphrey

AM. PHOTO-LITHOGRAPHIC CO. N. Y. (OSBORNE'S PROCESS.)

4 Sheets--Sheet 2.

D. W. G. & E. HUMPHREY.
Sewing-Machines.

No. 152,231. Patented June 23, 1874.

WITNESSES.
Herbert T. Whitman.
Eben Hutchinson.

INVENTORS
Daniel W. G. Humphrey
Eugene Humphrey

D. W. G. & E. HUMPHREY.
Sewing-Machines.

No. 152,231.

4 Sheets--Sheet 3.

Patented June 23, 1874.

WITNESSES
Herbert T. Whitman.
Eben Hutchinson.

INVENTORS
Daniel W. G. Humphrey
Eugene H. Humphrey

4 Sheets--Sheet 4.

D. W. G. & E. HUMPHREY.
Sewing-Machines.

No. 152,231.

Patented June 23, 1874.

WITNESSES
Herbert T. Whitman.
Eben Hutchinson.

INVENTORS.
Daniel W. G. Humphrey.
Eugene Humphrey.

UNITED STATES PATENT OFFICE.

DANIEL W. G. HUMPHREY, OF CHELSEA, AND EUGENE HUMPHREY, OF BOSTON, MASSACHUSETTS.

IMPROVEMENT IN SEWING-MACHINES.

Specification forming part of Letters Patent No. 152,231, dated June 23, 1874; application filed April 9, 1874.

*To all whom it may concern:*

Be it known that we, DANIEL W. G. HUMPHREY, of Chelsea, and EUGENE HUMPHREY, of Boston, in the county of Suffolk and Commonwealth of Massachusetts, have jointly invented certain Improvements in Sewing-Machines, of which the following is a specification:

Our invention relates to over-edge or button-hole-stitching machines; and consists in new devices, and in new arrangements and combinations of mechanism, for producing an edge-finish, and for automatically holding, guiding, and imparting the requisite movements to the material, while it is being operated upon to finish the edges of button-holes in the same.

The accompanying drawings illustrate our invention, of which—

Figure 1:
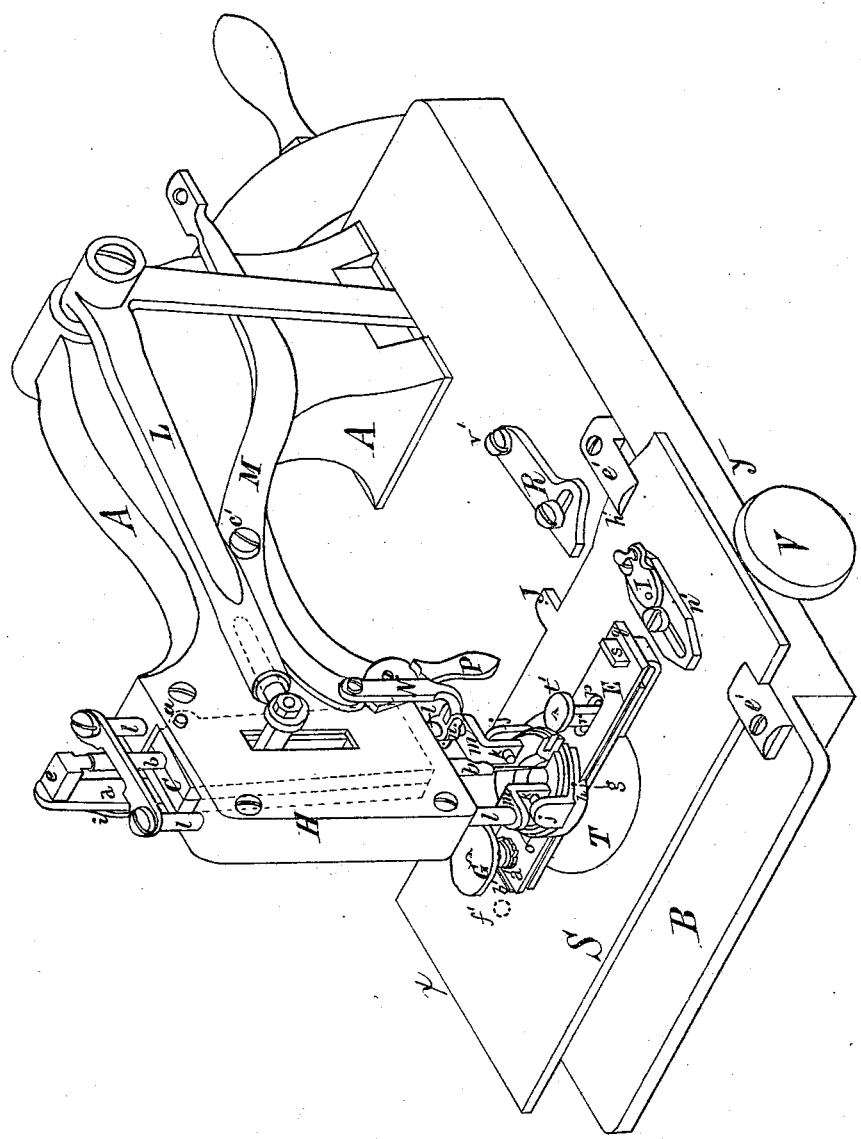
Figure 2:
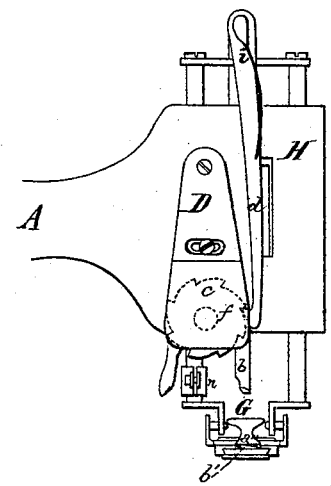
Figure 3:
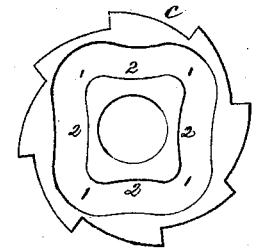
Figure 4:
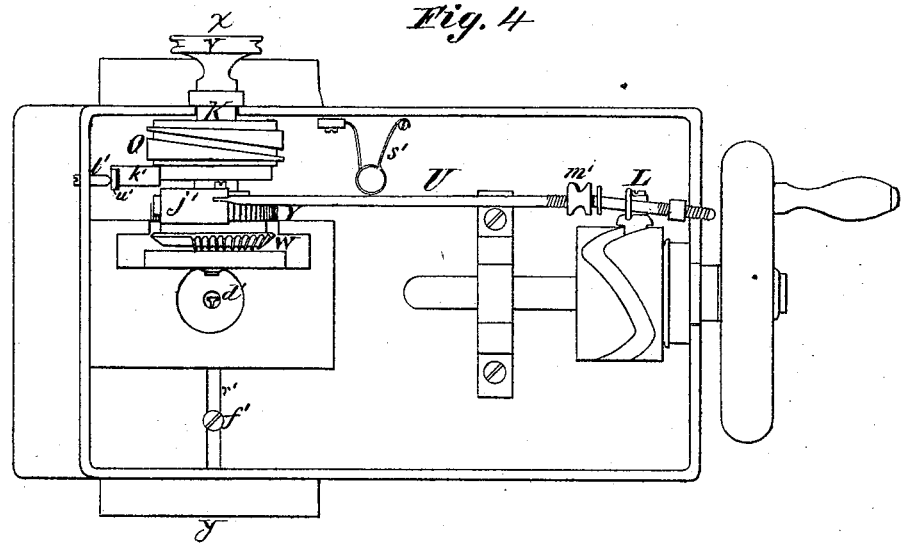
Figure 5:
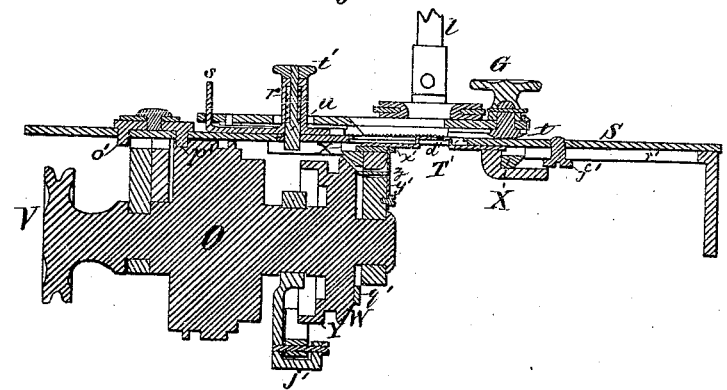
Figure 6:
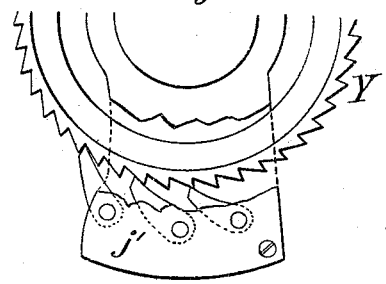
Figure 7:
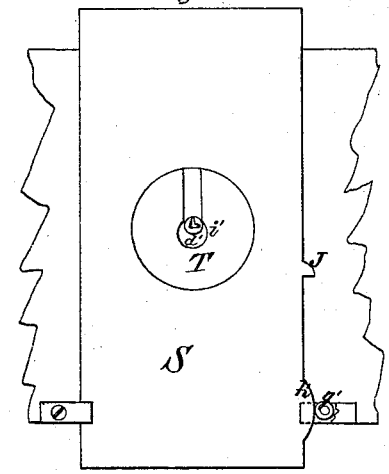
Figure 8:
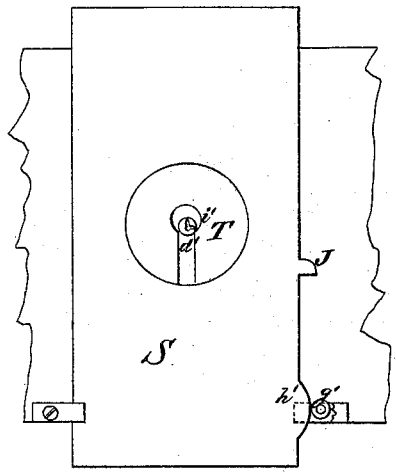
Figure 9:
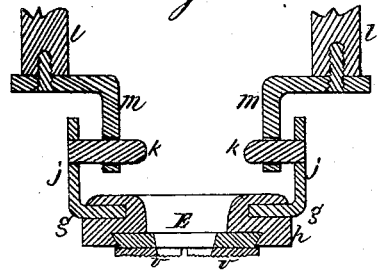
Figure 10:
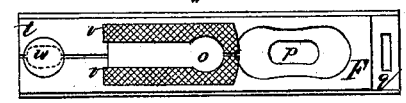
Figure 11:
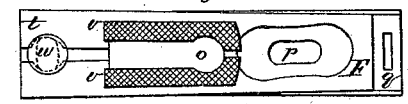
Figure 12:
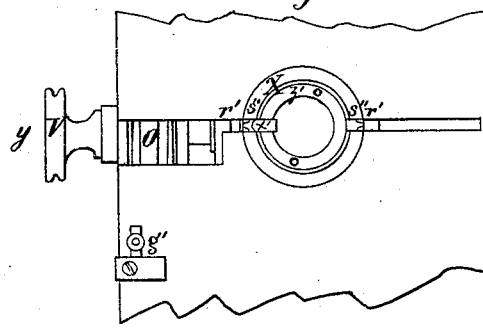
Figure 13:
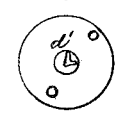
Figure 14:

Figure 1 is a perspective view of that portion of the machine above its bed as seen from the direction of the left front corner. Fig. 2 is a view of the back side of the head of the machine with its attachments. Fig. 3 is a plan of one side of a grooved ratchet-wheel or cam, employed to impart lateral movements to the needle-bar. Fig. 4 is a plan of the mechanism on the under side of the bed of the machine. Fig. 5 is a section through $x\,y$, Figs. 1, 4, and 12. Fig. 6 is a portion of the feed-ratchet Y, and pawl-carrier $j'$, Fig. 4. Figs. 7 and 8 are top views of the plates S and T, Fig. 1, showing plate T in two positions. Fig. 9 is a cross-section through the center of the presser-plate E, and the devices for supporting the same, shown in Fig. 1. Figs. 10 and 11 are views of the under side of said presser-plate E, showing the spreading-plates and cam for adjusting the opening for the passage of the needle, as hereinafter described. Fig. 12 is a top view of a portion of the bed of the machine with the plates removed, and showing the openings through which the studs connect the plates with the feeding mechanism, and a plan of the top of the annular gear X for turning plate T, Figs. 7 and 8. Fig. 13 is a plate containing the throat-piece, perforated for the passage of the needle and thread from the upper to the under side of the bed, and removed from collar $z'$, Fig. 12. Fig. 14 is a view of the toothed edge of annular gear X.

For convenience of description we will make three divisions of our invention, and describe the same accordingly.

The first division embraces that portion attached to and supported by the arm A and head H of the machine; and relates to a traveling feed and presser plate, before further allusion to which we will describe the needle holding and operating devices, which we do not claim as new, namely: The needle-bar carrier C is attached to the head of the machine by pivoting the same as shown at $a$, Fig. 1, on which pivot the carrier C oscillates, thereby causing the needle in the bar $b$ to swing, when raised above the goods in a direction lateral to the movement imparted to the goods operated upon, and to operate alternately as a perforating and non-perforating needle, carrying its thread first through the goods, then over the edge of the same, and through the button-hole. Upon the back of the head H, and more clearly shown in Fig. 2, is a device for imparting said lateral movement to the carrier C and bar $b$, and which consists, principally, of the grooved ratchet-wheel or cam $c$, an enlarged view of the inner and grooved side of which is given in Fig. 3. D is a bracket, attached by screws, as shown, to the head H, and on the lower end of this bracket, extending inwardly, is a stud, indicated by the dotted circle $f$. Upon this stud the cam C turns, and into the groove of the cam a stud, not shown, projects through a slot in head H, from the carrier C. Attached to the needle-bar $b$, and moving therewith is a hook, $d$, which swings on its connecting-block $e$, Fig. 1, and is kept in contact with the teeth of the ratchet-cam $c$ by the spring $i$. At every ascent of the needle-bar $b$ this hook $d$ turns the cam $c$ one tooth, and thereby the stud, which projects from the needle-bar carrier C into the groove of said ratchet-cam, is brought alternately into the positions marked 1 and 2 in said groove, Fig. 3, and thus the lateral movement is imparted to the carrier C, and the needle is made to pass alternately through the goods and through the button-hole, as hereinbefore described. The positions marked 1 in the groove of the cam regulate the outward throw when the needle passes over the edge and through the button-hole, and should be uniform; while the positions marked 2 regulate the inward throw or distance at which the needle perforates the goods from the edge of the button-hole; and these positions may be uniform and alike as to the extent of the inward swing or throw of the needle, or they may be variable, and cause the stitches to be inserted at varying distances from the edge, for the purposes described in Letters Patent of the United States numbered 125,393, and dated April 9, 1872.

There is also supported by, and raised and lowered from, the head of the machine a traveling feed and presser plate, E, which assists in holding and moving the material while being operated upon. This plate is pressed down upon the material stitched by any suitable means, and is connected with the lifting and depressing bars $l\ l$ by its holder $h$, supported by ring $g$, having ears $j\ j$ and pins $k\ k$ projecting through the hangers $m\ m$, attached by screws to said bars $l\ l$. These parts are more clearly shown in section drawing, Fig. 9. Plate E has beveled edges, which fit in a corresponding groove in holder $h$, as shown, and slides back and forth in said holder. The holder $h$ is suspended by, and rotates horizontally upon, the ring $g$, which ring is attached by its ears $j\ j$ to the pins $k\ k$, and by them suspended in the hangers $m\ m$, in which the whole is free to swing longitudinally and to vibrate laterally, for the purposes hereinafter described. The cut or opening shown through the front of said holder and ring is merely to obtain an unobstructed view of the button-hole when it is placed under the plate preparatory to stitching the same. Plate E has an opening, $o$, in form similar to a button-hole, for the passage of the needle through the same; also openings $p$ and $q$, to allow it to pass down over the posts $r$ and $s$. Attached to the under side of plate E, as shown in Figs. 10 and 11, is a spreader-plate, F, which is whole at the end near the opening $q$, and there attached to the upper and main plate, and divided at the opposite end, and is cut out in the form shown around the opening $p$, to allow its sides to separate when spread, and come together again when released with the proper elasticity. It has attached to it two rough-surfaced plates, $v\ v$, to assist in firmly holding the goods and spreading the button-hole, equidistant from whose inner edges the edges of the button-hole are placed when ready for stitching.

When the button-hole is thus set the spreader-plate is closed, as shown in Fig. 10. Before commencing to stitch, the plate and button-hole are spread, so as to allow a clear passage for the needle between the edges of the button-hole. This spreading is accomplished as follows: A stud, the enlarged end of which is shown at $t$, projects up through the plates F and E into the knob G, Figs. 1, 2, and 5. On this stud is a small spreader-cam, $w$, (shown in dotted lines in Figs. 10 and 11.) The stud to which this cam is attached is pinned to knob G, as shown in Fig. 5. By turning said knob with the thumb and fingers, the elliptical cam $w$ is placed in the position, between the edges of the spreader-plate F, shown in Fig. 11, which indicates the extreme opening or spread of said plate. To allow it to resume its closed position, as shown in Fig. 10, we continue to turn the knob G in the same direction until the cam is brought around into that position again.

It is desirable to be able to spread the plate less than the full spread, (shown in Fig. 11,) and to hold it firmly in such partially-spread position, therefore we have arranged to graduate the spread by means of ratchet-teeth $a'$ on knob G, Figs. 1 and 2, and a spring-click, $b'$, attached to the end of plate E, and operating in said ratchet-teeth, as said knob and cam are rotated, to hold them in position against the spring force of plate F when partially spread.

By thus rotating the spreader-cam $w$ in one direction all the time, we are not obliged to disconnect the click and ratchet, as in the case of spreaders which move through only part of a circle to spread, and then retrace their movement to close again.

When in practical operation, the horizontal traveling movements of this plate E are always in conjunction with and conformity to those of the under plates, hereinafter described, and the plate E is kept in proper relative position to the under plates by the posts $r$ and $s$.

Upon the arm A of the machine is pivoted the needle-bar lever L, which connects, as shown in Fig. 1, with a stud projecting out from the needle-bar $b$ through the head H. Also, upon arm A is a lifting-lever, M, pivoted at $c'$, and connected, through link N and clasp $n$, to bar $l$. The opposite end of this lever projects a little beyond the arm A and bed of the machine, and is designed to be connected with a treadle, or otherwise, below the bed of the machine, and to be operated to lift the plate E from the goods by the foot, or in some manner without employing the hands of the operator for that purpose. Depressing said projecting end of the lever raises the plate E; and when the pressure is removed from the end of the lever said plate is forced down again by means of spiral springs around the bars $l\ l$ within the head H. When it is desired to have the plate E held suspended in its raised position, the outer end of lever M is sufficiently depressed to allow the cam-lever P, which will turn on its pivot by the weight of its handle into the position shown, to support the inner end of the lever M, with the parts attached thereto, in the raised position.

We will now describe the second division of our invention, consisting of the plates upon which the material rests when operated upon, and other parts attached to the upper surface of the bed of the machine.

The plates S and T rest upon the bed B, and travel with the material being stitched. The rotary plate T is constructed with an opening, as shown in Figs. 7 and 8, broad enough to admit the raised throat-piece $d'$, through which the needle passes, and corresponding nearly to opening $o$ in plate E, above described. It is fitted into plate S, as shown in Fig. 5, so that it is held down upon the bed, and carried by plate S in its movements back and forth across the bed of the machine; but has a rotary movement, independent of the movement of plate S, around the elevated throat-piece $d'$, (Figs. 7 and 8.) Plate S is held down upon the bed of the machine at its front end by the buttons $e'$ $e'$, and at its opposite end is held down and guided by the screw-stud $f'$, moving in slot $r'$, as shown in Figs. 4 and 5. This plate has a forward-and-backward movement across the bed of the machine to the extent of double the length of the longest button-hole, or about three inches, and a slight lateral or oblique movement, caused by the pressure of the yielding roll $g'$, Figs. 7 and 8, which is forced by a spring, $s'$, Fig. 4, against the projection $h'$ on the plate, and for the purpose of keeping the edge $i'$ of the rotary plate T against the raised throat-piece $d'$ while stitching the eyelet part of the button-hole. The movements of these two plates S and T in the process of stitching a button-hole is as follows: The plates are drawn forward toward the operator until the throat-piece $d'$ stands at the outer end of the opening in the rotary plate T; then, the material being properly placed between the upper and under plates, an intermittent movement is imparted to plate S, as hereinafter described, which moves both plates forward the length of one side of the button-hole, and into the position shown in Fig. 7, when a slight oblique movement of the plates to the left takes place, as above described, when plate S ceases to move, while the rotary plate T is moved around a half-revolution into the position shown in Fig. 8; then it ceases to turn, and plate S resumes its movement, first a little obliquely to the right, swinging on its stud $f'$, and then straight forward to the extent of the remaining side of the button-hole. During these movements the upper plate E is connected with rotary plate T by the posts $r$ and $s$, which are both attached to said rotary plate; and said plate E, by its peculiar construction and connection with the parts described, and shown in Fig. 9, is enabled to rest firmly down upon, and to adapt itself to any unevenness in the thickness of, the material, and to conform to all the varied movements of the under plates above described. The slide $n'$, Fig. 1, has attached to it on its under side two studs, $o'$ and $p'$, shown in Fig. 5, which are thrown in and out of the groove in the feed-cylinder O, hereinafter described, by turning to the right and left the shipper-plate I. Through these studs movement is imparted to plate S. Through post $r$ is another stud, $u$, which is held down by a spiral spring, and is raised, when desired, by taking hold of the nut $t'$ on its top. This stud projects downward through the rotary plate T into a slot in the bed of the machine, as shown in Fig. 5, and in conjunction with throat-piece $d'$ and stud $f'$, assists in guiding the plates S and T during the joint movements of the same, and through it is imparted the separate rotary movement to plate T, as hereafter described. After the plates have gone through the movements above described in stitching a button-hole, then, to return them to their starting position, the stud $u$ is raised, and the studs $o'$ and $p'$ are thrown out of connection with the feed-cylinder O, as described, and the plates are drawn back toward the operator as far as the throat-piece $d'$, or about the position shown in Fig. 8, when the plate T is rotated around said throat-piece to about the position shown in Fig. 7, and then both plates are again drawn directly back towards the operator to the starting-point. To facilitate the operation of adjusting the position of the plates to sets of button-holes of uniform lengths an adjustable stop, R, is employed, which is secured to the bed of the machine by a screw, $v'$, on which it swings, and its opposite end is enlarged and slotted, and secured by a screw, as shown, when set at any desired position, to come in contact with projection J on plate S to stop the same at such fixed point, according to the length of the button-holes being stitched.

There now remains to be described the mechanism for actuating the above-described traveling-plates.

This mechanism is represented in drawings 4, 5, 6, 12, and 14. Upon the shaft K, Fig. 4, is a spirally-grooved cylinder, O, employed for feeding the material by moving said traveling cloth-plates, and spacing the stitches on the sides of the button-hole. The semicircular beveled gear W on the same shaft is employed in conjunction with the annular gear X, Figs. 12 and 14, to feed the material by moving the rotary plate T, to space the stitches around the eyelet part of the button-hole. The ratchet-wheel Y on the same shaft is employed to rotate said shaft intermittently, and give to said cylinder and gear the required movement to actuate said plates. Said ratchet-wheel is operated by the needle-bar lever L through the reciprocating rod U, the movement of which is adjustable and regulated by changing the position of the nut $m'$, so that the lever L will come in contact with it during more or less of its movement, and consequently give said rod and ratchet a greater or less movement. To the opposite end of rod U is attached the ratchet pawl-carrier $j'$, more fully shown in Fig. 6, wherein a portion of the carrier is represented as broken away to show the number and position of the pawls. When the pawls cease to turn the ratchet-wheel, and move backward to renew their hold upon the teeth of the same, the wheel is prevented from turning backward by the friction-block $k'$, which is pressed against a portion of cylinder O by screw $l'$ acting against spring $w'$ on the back of said block. The semicircular gear W, Fig. 4, operates the annular gear X, Figs. 12 and 14. This last-named gear has two slots at $s''$ $s''$, for the reception of the stud $u$ in the rotary plate T, Fig. 5, when the plates have reached the position to stitch the eye or round end of the button-hole; and said gear X by means of its said slot $s''$ carries said rotary plate T around one-half a revolution for that purpose, and then halts while said stud $u$ moves out of the slot by reason of the forward movement of plate S, carrying with it plate T and its said stud $u$. One-half the teeth being omitted from gear W, it imparts but one revolution to gear X, while it makes two revolutions itself, and thus gear X is permitted to halt and receive and deliver the stud $u$, as described. Two slots are made in gear X opposite each other in order that there may be one presented for the reception of said stud $u$ at every revolution of gear W, and thereby adapting it to the varying lengths of button-holes. While gear W is moving through that portion of its revolution when its teeth are not in contact with gear X, it is necessary to secure gear X in the position in which gear W leaves it, with its slots $s'' s''$ opposite the openings $r' r'$, Fig. 12, in the bed of the machine, along which said stud $u$ moves when passing in and out of the slots $s'' s''$. To accomplish the locking or securing of the gear X in the position described, a detent, $x'$, Figs. 5 and 12, is employed, which is forced into the slot $s''$, when the gear comes around into proper position, by the spring $y'$, which enters said detent as shown, and locks the gear X in that position. To release the gear from the detent $x'$ before the teeth of gear W come around and into contact with it again, the pin $z$, Fig. 5, is employed, one end of which rests against spring $y'$, while the other end projects through the bracket to which said spring is attached, and very close to the face of gear W, upon which a wedge-shaped piece, $q'$, is attached, which forces said pin $z$ back, and with it said spring $y'$ and detent $x'$, and thus releases said gear X, a little in advance of the contact of the teeth of the two gears. When the described plates are in proper position to commence stitching a button-hole, the material in which the hole is first cut is placed beneath the top presser-plate E, with the button-hole in the opening in said plate, and its edges equidistant all around from the edges of said opening; then said plate E is let down upon the same with the proper pressure, and into connection with rotary plate T, through the posts $r$ and $s$, as described. Studs $o'$ and $p'$, Fig. 5, attached to the under side of slide $w'$, Fig. 1, are next shipped into working position, as before described, and as shown in Fig. 5, said stud $p'$ coming first into contact with the spiral groove of cylinder O, and through which movement is imparted to the said plates during the process of stitching one side of the button-hole, which being completed, the stud $p'$ passes to the opposite end of the cylinder and out of the spiral groove, and remains at rest while the stud $u$ of the rotary plate T, (which has to this point run in slot $r'$ in the bed, Fig. 12,) has now passed into slot $s''$ of gear X, and is carried around to the opposite side of said gear, during the process of turning the material and stitching the round end of the button-hole. Then stud $o'$ is brought into contact with the spiral groove in the feed-cylinder by the rotation of said cylinder, and passes along, carrying the plates in the same manner as stud $p'$ while the last side of the button-hole is being stitched. Thus the plates and material are moved and the stitches spaced around the entire button-hole, except the end opposite the eyelet, which is subsequently fastened off or "barred" by hand. The circular movement of plate T has to be relatively faster than the direct movement of the plates S and T, in order to secure a uniform spacing of the stitches on the straight sides and circular end of the button-hole, and for the reason that the circle described by the annular gear X, which moves the rotary plate T, is much greater than the concentric circle around which the stitches are spaced on the eye of the button-hole. Therefore the spiral groove around cylinder O is formed with reference to the movement of said annular gear, and so as to give a direct movement to the plate S relatively slower than the circular movement imparted to the rotary plate T, to secure the requisite uniformity in the spacing of the stitches, and a handsome "purl" around the entire edge of the button-hole. On the shaft K, Fig. 4 is a hand-wheel or knob, V, for the purpose of moving the plates by hand, independently of the stitching mechanism, when desiring to change the position of the button-hole relative to the needle, or to bring holes of different length into proper position to commence stitching the same.

We are aware that traveling-plates have been employed both on top and underneath the material for holding, guiding, and moving the same while button-holes were being stitched, as in the English patent to Julian Bernard, numbered 2,537, issued in 1853; and United States patent, numbered 13,353, issued to James Harrison, Jr., July 31, 1855; and we make no claim to such plates as employed in said patents; but we are not aware that plates constructed, arranged, combined, and operated as in our improvements herein described have ever been used; and We therefore claim as our invention—

1. The traveling presser-plate E, suspended and operating as described, and having a spreader-plate, F, attached, or an adjustable opening for the passage of the needle, substantially as and for the purposes specified.

2. The traveling presser-plate E, holder $h$, and supporting-ring $g$, combined and arranged to operate together, substantially as and for the purposes specified.

3. The presser-plate E, holder $h$, ring $g$, and bars $l$ $l$, combined and operated substantially as and for the purposes specified.

4. The lifting-lever M, connected and combined with the presser-plate E, substantially as and for the purposes specified.

5. The lever P, in combination with lifting-lever M and presser-plate E, when arranged to operate substantially as and for the purpose specified.

6. The rotary spreader-cam $w$, ratchet $a'$, click $b'$, and plate F, when combined and arranged to operate substantially as and for the purposes specified.

7. The traveling presser-plate E, suspended from the head of the machine, substantially as described, in combination with plates S and T, whereby the cloth is held and moved, as set forth.

8. The traveling presser-plate E, suspended from the head of the machine, and the plates S and T, in combination with a vibrating or laterally-moving needle, substantially in manner and for the purposes specified.

9. The combination of movable studs $o'$ and $p'$, plate S, and cylinder O, to operate substantially as and for the purposes specified.

10. The combination of movable stud $u$, rotary plate T, and annular gear X, to operate substantially as and for the purposes specified.

11. The stop R, in combination with plate S and its projection J, for the purpose specified.

12. The combination of yielding-roll $g'$ with plates S and T and throat-piece $d'$, operating together as and for the purposes specified.

13. The plates S and T, in combination with mechanism substantially as described, for automatically imparting to them, successively, the joint and separate direct, lateral, and rotary movements described.

14. The combination of annular gear X, semicircular gear W, and plate-stud $u$, arranged to operate substantially as and for the purposes specified.

15. The annular gear X, in combination with holder $h$, operating together on opposite sides of the material and around a common center, substantially as and for the purposes specified.

16. The combination of the semicircular gear W, annular gear X, and rotary plate T, substantially as and for the purposes specified.

17. The combination of the raised throat-piece $d'$, rotary plate T, and plate S, constructed and arranged to operate together substantially as and for the purposes specified.

18. The combination of the slotted bed $r'$ $r'$, stud $u$, plate T, and throat-piece $d'$, arranged to operate together, as shown, and for the purposes specified.

19. The combination of the slotted bed $r'$, stud $f'$, raised throat-piece $d'$, and plate T, all operating together substantially as and for the purposes specified.

20. The combination of gear X, detent $x'$, and annular slotted projection $z'$ of the bed B, for holding said gear in position, substantially as and for the purpose specified.

21. The combination of adjustable reciprocating rod U and ratchet-wheel Y, whereby, through intermediate devices, substantially as described, the rotation of said ratchet-wheel imparts to feed-plates S and T their joint and several movements, substantially as specified.

DANIEL W. G. HUMPHREY.
EUGENE HUMPHREY.

Witnesses:
MARY R. LANE,
EBEN HUTCHINSON.